Jan. 31, 1961 M. C. PRESNICK 2,969,891
CASE FINISHING MOLDING
Filed March 12, 1958
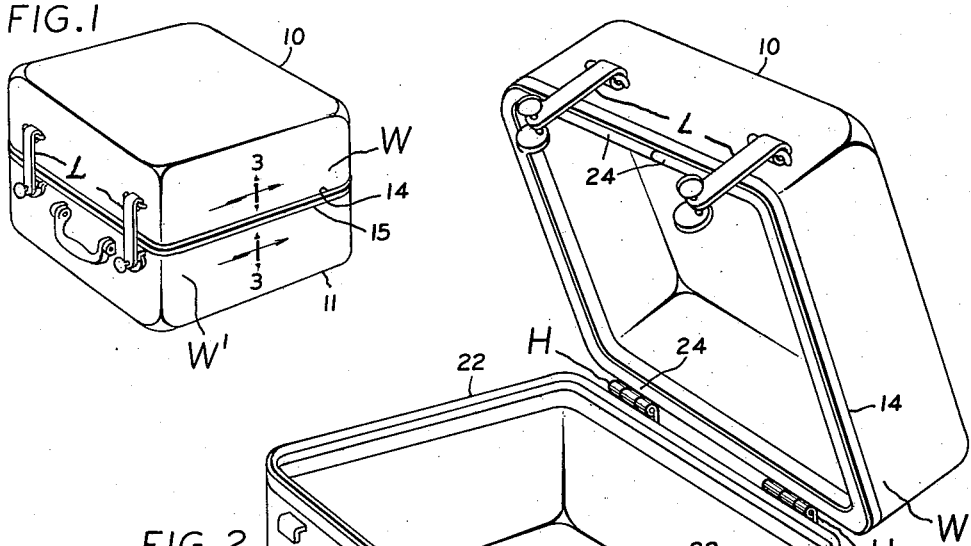
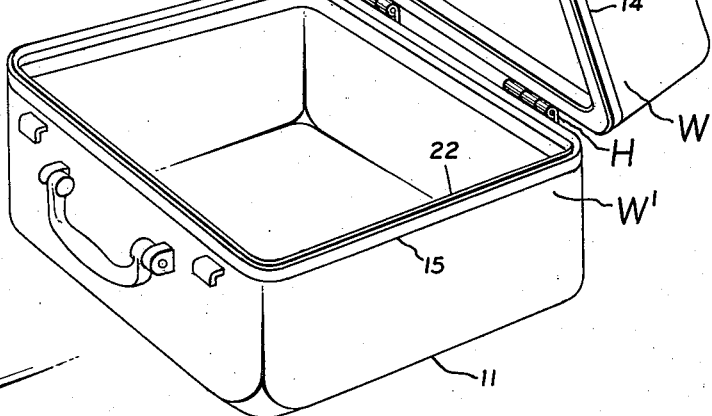
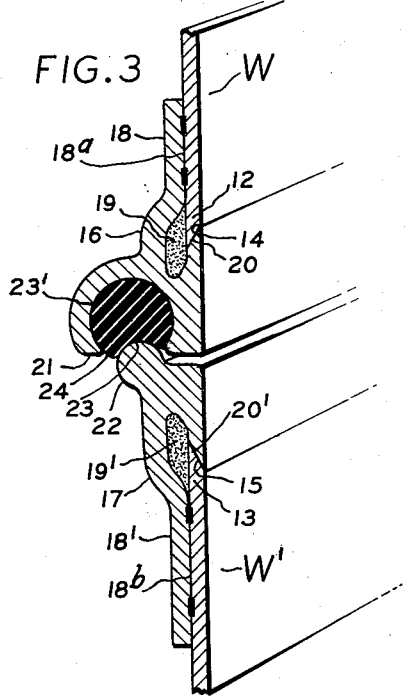
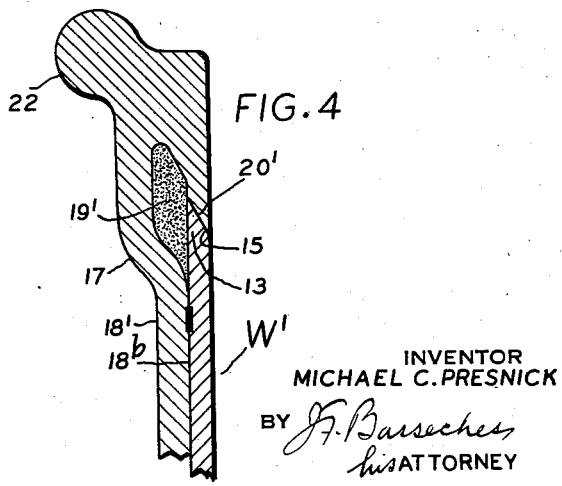
INVENTOR
MICHAEL C. PRESNICK
BY Barseches
his ATTORNEY United States Patent Office 2,969,891
Patented Jan. 31, 1961

2,969,891
CASE FINISHING MOLDING
Michael C. Presnick, 150—20 71st Ave., Flushing, N.Y.
Filed Mar. 12, 1958, Ser. No. 720,869
7 Claims. (Cl. 220—73)

This invention relates to cases, chests or like containers and particularly to impervious containers or housings of the type commonly employed for scientific instruments or other apparatus which would be injuriously affected by exposure to moisture, corrosive vapors and the like.

More particularly, this invention relates to instrument carrying cases or the like which comprise two or more impervious partial shells or sections, the terminal edges of said sections, in the closed condition of the case, forming with each other a moisture and vapor seal.

Still more particularly, this invention relates to metallic containers having two or more partial shells, the terminal edges of the said shells being provided with an edging or molding strip of novel design, to assure leakproof junctions of the shell edge and molding strip.

Known to me are impervious metallic containers comprising hinged, open mouth compartments, the mouth portion of one of the said compartments usually being provided with a gasket assembly adapted to be intimately engaged by a pressure area formed by the mouth portion of the other compartment. In a construction frequently employed, the gasket and pressure area members are not formed integrally with the partial shells or compartments but, rather, these members are carried by continuous, carefully machined molding or edging strips, which strips are seated over the terminal edges of the compartments. The molding strips are usually affixed to the compartments by a series of spot welds, at points adjacent the mouth or edge portions of the compartments.

In the past, to assure water-tight interfitting of the strips and shells, sealants in the form of thermosetting resins have been applied along the junction between the said parts, the heat incident to the welding operation serving to flow the then liquified resins into any gaps which may exist between the strips and the shells.

The welding and adhesive applying operations have, in the heretofore known constructions, been accompanied by certain undesirable side effects which have lessened the water impervious characteristics, as well as spoiling the appearance of the finished case.

In such known constructions, the molding strip is normally provided with a flange which is intimately engaged with the walls adjacent the mouth of the compartment and with a right angular extending lip forming a butt joint with the upper edge of the said mouth portion. When resinous substances are distributed between the strip and the case, and the latter components are subjected to the heat incident to spot welding, the expanding resins have a tendency to force the strip and case apart, thereby causing the formation of pores or apertures through which vapors or moisture may penetrate, and at the same time squeezing quantities of the resin out of the junction between the strip and case, to form unsightly droplets.

Likewise, the welding heat causes the adjacent metal parts of the strip and case to expand and to force each other apart, and upon cooling, these parts will not be returned to the intimate contacting condition they occupied prior to welding.

A particular problem encountered in the known structures as heretofore described is what may be the tendency of the flange of the molding strip to become separated from the side walls adjacent the mouth of the case under the pressurizing influence of the expanding metals and the expanding resin interposed between the side walls and flange.

Accordingly, it is an object of my invention to provide a novel molding strip construction which assures a waterproof junction between the strip and the partial shell or compartment over which the strip is fastened. A further object of my invention is to provide a strip of the type described having a novel construction whereby sealants such as resins interposed between the said strip and a partial shell portion to which the strip is applied will be maintained in waterproofing position adjacent the junction of said strip and shell and will not be forced outwardly, to weaken and disfigure the said junction.

Still another object of this invention is to provide a molding strip construction adapted intimately to engage the mouth adjacent portion of a partial shell member, and to resist unseating from said member under the expanding and contracting changes caused by heating and cooling, such as would be occasioned by welding the strip to the shell member.

Still a further object of this invention is to provide a novel, water-tight case structure wherein specially formed edge portions defined by the partial shell members forming the said structure cooperate with a novel molding strip to form a water and vapor impervious junction, which junction is not disrupted by the expansion and contraction influences encountered in welding the strip to the shell.

Still a further object of this invention is to provide a structure of the type described wherein the walls of said structure and the molding strip form a sealed circumferential reservoir for resinous and like compounds surrounding the junction of the strip and walls to insure water and vapor impregnability.

To attain these objects and such further objects as may appear herein or be hereinafter pointed out, I make reference of the accompanying drawings, forming a part hereof, in which:

Figure 1 is a perspective view of a case in accordance with my invention;

Figure 2 is a magnified perspective view of the case of Figure 1 in the open position;

Figure 3 is a magnified section taken on the line 3—3 of Figure 1;

Figure 4 is a further magnified section of one of the joints, similar to Figure 3.

A water-tight case in accordance with my invention comprises a pair of impervious compartments or partial shell members 10, 11, preferably of sheet aluminum or a like metallic, corrosion resistant substance. The shells 10, 11 are formed with circumferential walls defining mouth portions 12, 13, respectively, the said mouth portions preferably being of substantially identical measurements, so as to permit the two mouth portions to register when superimposed.

The outer edges 14, 15 of the mouth portions 12, 13 are bevelled or chamfered to slope outwardly, for purposes which will appear hereafter.

The case is provided with continuous annular upper and lower molding strips 16, 17, arranged to be seated over the mouth portions 12, 13, respectively, of the partial shells. These strips are preformed, accurately machined, and are understood to provide extended contacting surfaces. Each of the molding strips 16, 17 is provided with an extended flange portion 18, 18', arranged intimately to engage the inner walls of the shells 10, 11 adjacent the mouth portions 12, 13. The flanges 18, 18', at points closely adjacent the mouth portions 12, 13, respectively, slope inwardly away from the walls W, W', to define continuous recessed portions 19, 19', about the outer circumferential peripheries of the strips 16 and 17.

The strips are additionally provided with lip or shoulder portions 20, 20', offset from the contacting surfaces 18a and 18b for the thickness of the sheeting of the metal of the case where a flush wall is desired, the said portions being chamfered or bevelled to form supplemental angles to the bevelled edges 14, 15 of the partial shells.

The outer or mating ends 21, 22 of the molding strips 16, 17 are provided in a known manner with complemental closure means to provide a water-tight junction when the shells are superimposed. For this purpose, the strip 16 is formed with a horseshoe shaped recess 23 about its lower periphery, the said recess being adapted to retain a yieldable gasket 24.

The opposed strip 17 is provided at an edge portion 22 with a raised peripheral pressure area 23, arranged, in the sealed position of the case, to be impressed into the gasket 24, thus to form a water and, to a large extent, vapor impervious barrier at the junction of the two strips.

The partial shells 10, 11 are, in the illustrated case, provided at a rearward portion with hinges H and at a front portion with pressure catches or latches L, to secure the halves together in pressured interengagement in the closed position of the case.

The strips 16, 17 are secured over the mouth portions 14, 15 of the shells by spot welding the flanges 18, 18' at intermittent points to the walls of the shells 10, 11. To assure an impervious junction of the strips to the shells, a thermo-setting resinous compound in the potentially reactive stage, of which an epoxy resin mixture may be taken as an illustration, is dispersed about the periphery of the junction within the recesses 19, 19'. It will be readily recognized that when the strips 16, 17 are manually seated over the edges of the partial shells, the recesses 19, 19' of the strips form, with the walls defining the mouth portions 12, 13, annular reservoirs and thus contain the resinous material dispersed within the recesses 19, 19' prior to seating the strips over the corresponding shell members.

With the strips thus positioned over the shells, the flanges may be spot welded at spaced points to the walls W, W' of the shell members. The heat incident to spot welding will not adversely affect the sealant where the reservoir is filled and may also polymerize the resinous material within the annual reservoirs to the irreversible stage, at the same time flowing the said resin to form a sealant within the reservoirs, thereby compensating for possible flaws in the interfit of the molding strip and partial shells. The reservoir adjacent the abutting joint provides an excess of the sealant, to assure no damage to the joint if unduly lengthy heat treatment is applied.

Contrary to known case structures, the heat such as in welding which may cause the junction forming parts alternately to expand and then, upon cooling, to contract, does not in my device destroy the water resisting properties of the joint, since the bevelled, abutting relationship of the lip of the molding and the edge of the shell will not, upon expansion and subsequent contraction, permanently cause spacing of the adjoining parts, but will, to the contrary, augment the intimate contact of the said parts.

It will be understood that while the preferred practice of my invention calls for the edge of the partial shell and also the lip or shoulder of the molding to be bevelled, the above noted advantages may, to a degree, be obtained if only one of the aforesaid parts is bevelled. Likewise, while I have illustrated my invention in connection with a case wherein the edge or mouth portions of the separate shells are of the same size, it will be readily recognized that by varying the offset of one or the other molding strips, shells of varying sizes may be accommodated to each other.

My carrying or instrument case will be found to have superior water and, to a measure, vapor resistant qualities, which properties will remain even after frequent rough use, or use in areas having widely varying climatic conditions.

Having thus described my invention and illustrated its use, what I claim as new and desire to secure by Letters Patent is:

1. In a sealable case comprising a pair of water impervious partial shell members having walls terminating in edges, the edges of said shells being adapted to register when superimposed, having inner edge engaging portions arranged to be continuous, molding strip members seated on said edges to form a sealing joint therewith and having outer seal portions arranged in the closed position of said case to form an impervious junction with each other comprising inwardly extending flange members adjacent said edge engaging portions, arranged intimately to be engaged with the inner faces of the walls adjacent said edges, offset lip portions spaced from said flange members, said lip portions including inner circumferential camming faces providing a seat to engage said edges in abutting relation and urge the flange inwardly against said walls as said strip members are seated over said edges, said walls, lip portions and flange members having rearwardly offset walls, adjacent the inner edges of each said shell member, a seated annular reservoir terminating adjacent said lip portions.

2. A case in accordance with claim 1 wherein said edges are bevelled inwardly to cooperate with said camming faces of said lip portions.

3. A case in accordance with claim 2 wherein said reservoirs are at least partially filled with an impervious sealing compound.

4. A case in accordance with claim 1 wherein said reservoirs are at least partially filled with an impervious sealing compound.

5. An impervious case comprising impervious partial shell members having walls defining terminal edges arranged to register in the closed position of said case, clasp means arranged in the closed position of said case to urge said shell members into pressured engagement with each other, and molding strip members mounted on said edges and arranged to form impervious junctions with said edges and, in the closed position of said case, with each other, said strip members including inner edge engaging portions and outer seal portions, said inner portions comprising extended flange members arranged to be intimately engaged with the inner faces of the walls adjacent said edges, offset lip portions spaced from said flange members, said lip portions including inner camming faces providing a seat to engage said edges and urge the flange inwardly against said walls as said strip members are seated over said edges, said walls, lip portions and flanges defining, adjacent the inner edges of each said shell member, a sealed reservoir.

6. A case in accordance with claim 5 wherein said edges are bevelled inwardly to cooperate with said camming faces of said lip portions.

7. A case in accordance with claim 6 wherein said reservoirs are at least partially filled with an impervious sealing compound.

References Cited in the file of this patent

UNITED STATES PATENTS

| | | |
|---|---|---|
| 2,398,788 | Hedrick | Apr. 23, 1946 |
| 2,510,643 | Long | June 6, 1950 |
| 2,604,961 | Koch | July 29, 1952 |
| 2,773,301 | Karmzin | Dec. 11, 1956 |

FOREIGN PATENTS

| | | |
|---|---|---|
| 259,424 | Great Britain | Oct. 14, 1926 |